(12) United States Patent
Wang et al.

(10) Patent No.: US 11,671,808 B2
(45) Date of Patent: Jun. 6, 2023

(54) ENHANCEMENT ON SMARTWATCH IMPLEMENTATION

(71) Applicant: Google LLC, Mountain View, CA (US)

(72) Inventors: Jibing Wang, San Jose, CA (US); Erik Richard Stauffer, Sunnyvale, CA (US); Qin Zhang, Fremont, CA (US)

(73) Assignee: Google LLC, Mountain View, CA (US)

( * ) Notice: Subject to any disclaimer, the term of this patent is extended or adjusted under 35 U.S.C. 154(b) by 83 days.

(21) Appl. No.: 17/225,201

(22) Filed: Apr. 8, 2021

(65) Prior Publication Data

US 2022/0329997 A1    Oct. 13, 2022

(51) Int. Cl.
| | |
|---|---|
| *H04W 4/80* | (2018.01) |
| *H04L 41/0806* | (2022.01) |
| *H04W 76/15* | (2018.01) |
| *H04W 76/11* | (2018.01) |
| *H04L 5/14* | (2006.01) |

(52) U.S. Cl.
CPC ............... *H04W 4/80* (2018.02); *H04L 5/14* (2013.01); *H04L 41/0806* (2013.01); *H04W 76/11* (2018.02); *H04W 76/15* (2018.02)

(58) Field of Classification Search
CPC ....... H04W 4/80; H04W 76/15; H04W 76/11; H04L 5/14; H04L 41/0806; H04L 41/0816; H04L 43/08; H04L 43/16; Y02D 30/70
See application file for complete search history.

(56) References Cited

U.S. PATENT DOCUMENTS

| | | | |
|---|---|---|---|
| 10,009,068 B2 | 6/2018 | Kuscher et al. | |
| 2016/0295622 A1 | 10/2016 | Huang et al. | |
| 2020/0204963 A1 | 6/2020 | Park et al. | |
| 2020/0359223 A1* | 11/2020 | Kim ..................... | H04W 24/10 |
| 2022/0191957 A1* | 6/2022 | Shah .................... | H04W 76/15 |

* cited by examiner

*Primary Examiner* — Zhensheng Zhang
(74) *Attorney, Agent, or Firm* — Lerner David LLP (57) ABSTRACT

The subject matter described herein provides systems and techniques to automatically configure a proximal device, such as a smart watch, a tablet, or any other smart device, based on configuration information sent from the user equipment (UE) to the proximal device when the local communications connection, such as a wireless connection, between the devices is weak. If it is determined that there is a weak local communications connection between the UE and the proximal device the UE may automatically send network configuration information to the proximal device. If it is determined that there is a weak local communications connection between the UE and the proximal device the UE may automatically turn on its mobile hotspot, and automatically send the mobile hotspot configuration information to the proximal device.

20 Claims, 5 Drawing Sheets

ENHANCEMENT ON SMARTWATCH IMPLEMENTATION

BACKGROUND

A local wireless communications connection, such as a Bluetooth (BT) connection/link, may exist between a user equipment (UE), such as a mobile device, and a proximal device, such as a smart watch, a tablet, or any other smart device. Such a local wireless connection may be used as a tethering connection to share the UE's connection to the cellular network and/or the Internet with the proximal device. However, in some instances, this way of allowing a proximal device to access the cellular network and/or the Internet via the UE may only allow for a slow speed connection. In particular, a slow speed connection may result when the local wireless communications connection is weak. In such cases, a proximal device may be able to access the cellular network and/or the Internet directly through a direct network connection or via a separate tethering connection to the UE to increase connection speed. However, allowing the proximal device to configure these connections itself without assistance from the UE, or having a user manually configure these connections may be inefficient, tedious, time-consuming, and may consume a high amount of energy. In addition, manual configuration by a user may disrupt or ruin the user's experience in using the proximal device.

BRIEF SUMMARY

The present disclosure provides for automatically configuring a proximal device, such as a smart watch, a tablet, or any other smart device, based on configuration information sent from the user equipment (UE) to the proximal device when the local communications connection between the devices is weak. In some examples, if it is determined that there is a weak local wireless communications connection between the UE and a proximal device the UE may automatically send network configuration information to the proximal device. In such examples, the local wireless communications connection may be a BT connection, the UE may be a smart phone, and the proximal device may be a smart watch. In such examples, the network configuration information may be cellular network configuration information. The network configuration information may be sent using any local communications connection between the UE and the proximal device. The configuration information may be stored, by the proximal device, and used to automatically configure it in order to allow it to directly connect to the Internet using its own network connection, such as its cellular network connection. In some examples, the UE may automatically send Wi-Fi network configuration information, such as Wi-Fi Access Point information, to the proximal device, in addition to or independent of the cellular network configuration information.

In some examples, if it is determined that there is a weak local wireless communications connection between the UE and a proximal device the UE may automatically turn on its mobile hotspot, which uses a Wi-Fi connection. In such examples, the local wireless communications connection may be a BT connection, the UE may be a smart phone, and the proximal device may be a smart watch. The UE may also automatically send the mobile hotspot configuration information to the proximal device. This configuration information may be sent using any local communications connection between the UE and the proximal device. The configuration information may be stored, by the proximal device, and used to automatically configure it in order to allow it to connect to the Internet via the mobile hotspot Wi-Fi station connection with the UE. In some examples, if it is determined that the network connection of the UE is weak, when the proximal device is using the UE to access the Internet via tethering, the UE may automatically notify the proximal device to turn on its network connection. In such examples, the network connections may each be a cellular network connection.

In general, one aspect of the subject matter described in this specification is a process for configuring connection settings of a device. A connection quality for a communications connection between the first device and a second device may be monitored at a first device. The first device may be proximal to the second device. As used herein, proximal may mean that the first device is located in close geographic proximity to the second device in a way that the first device may be able to have a local communications connection with the second device. For example, the first device and the second device may be located near to each other and may communicate directly with each other using a Bluetooth (BT) connection, a Wi-Fi connection, a Zigbee connection, an infra-red connection, a wired connection, or the like. It may be determined that the connection quality is below a pre-determined threshold value. Configuration information may be sent from the first device to the second device to allow the second device to connect to a network. This may occur in response to the determination that the connection quality value is below the threshold value. The first device may be a user equipment (UE) device, and the second device may be a proximal device. The connection quality may include an indication of signal strength of the communications connection between the first device and the second device. The network may be a cellular network. The configuration information may be associated with cellular network attributes used by the first device to connect to the network. The cellular attributes may include at least one of Radio Access Technology (RAT) type, a RAT frequency division duplex configuration, a RAT time division duplex configuration, a uplink/downlink slot configuration for time division duplex, a RAT frequency and bandwidth, a RAT synchronization signal configuration, a RAT synchronization signal frequency/timing offset, a RAT cell-ID, a Global Navigation Satellite System assistant information, and an Ultra-wideband configuration information. The configuration information may be associated with Wi-Fi network attributes. The Wi-Fi network attributes may include at least one of mobile hotspot configuration information, a channel/service set identifier (SSID), authentication information, and Wi-Fi access point information.

Another aspect of the subject matter includes a system for configuring connection settings of a device. The system may include one or more processors configured to perform several actions. A connection quality for a communications connection between the first device and a second device may be monitored at a first device. The first device may be proximal to the second device. It may be determined that the connection quality is below a pre-determined threshold value. Configuration information may be sent from the first device to the second device to allow the second device to connect to a network. The network may be a cellular network. The first device may be a user equipment (UE) device, and the second device may be a proximal device. The connection quality may include an indication of signal strength of the communications connection between the first device and the second device. For example, the connection quality value may be a data rate value associated with the communications connection, a signal strength value, such as a received signal strength indicator (RSSI), associated with the communications connection, a bit error rate associated with the communications connection, and/or any other value associated with the quality of the communications connection. The configuration information may be associated with cellular network attributes used by the first device to connect to the network. The cellular attributes may include at least one of Radio Access Technology (RAT) type, a RAT frequency division duplex configuration, a RAT time division duplex configuration, a uplink/downlink slot configuration for time division duplex, a RAT frequency and bandwidth, a RAT synchronization signal configuration, a RAT synchronization signal frequency/timing offset, a RAT cell-ID, a Global Navigation Satellite System assistant information, and an Ultra-wideband configuration information. The configuration information may be associated with Wi-Fi network attributes. The Wi-Fi network attributes may include at least one of mobile hotspot configuration information, a channel/service set identifier (SSID), authentication information, and Wi-Fi access point information.

Yet another aspect of the subject matter includes a non-transitory computer-readable medium storing instructions, that when executed by one or more processors, cause the one or more processors to perform various operations. A connection quality for a communications connection between the first device and a second device may be monitored at a first device. The first device may be proximal to the second device. It may be determined that the connection quality is below a pre-determined threshold value. Configuration information may be sent from the first device to the second device to allow the second device to connect to a network. The first device may be a user equipment (UE) device, and the second device may be a proximal device. The connection quality may include an indication of signal strength of the communications connection between the first device and the second device. The network may be a cellular network. The configuration information may be associated with cellular network attributes used by the first device to connect to the network. The cellular attributes may include at least one of Radio Access Technology (RAT) type, a RAT frequency division duplex configuration, a RAT time division duplex configuration, a uplink/downlink slot configuration for time division duplex, a RAT frequency and bandwidth, a RAT synchronization signal configuration, a RAT synchronization signal frequency/timing offset, a RAT cell-ID, a Global Navigation Satellite System assistant information, and an Ultra-wideband configuration information. The configuration information may be associated with Wi-Fi network attributes. The Wi-Fi network attributes may include at least one of mobile hotspot configuration information, a channel/service set identifier (SSID), authentication information, and Wi-Fi access point information.

DETAILED DESCRIPTION

Figure 1:
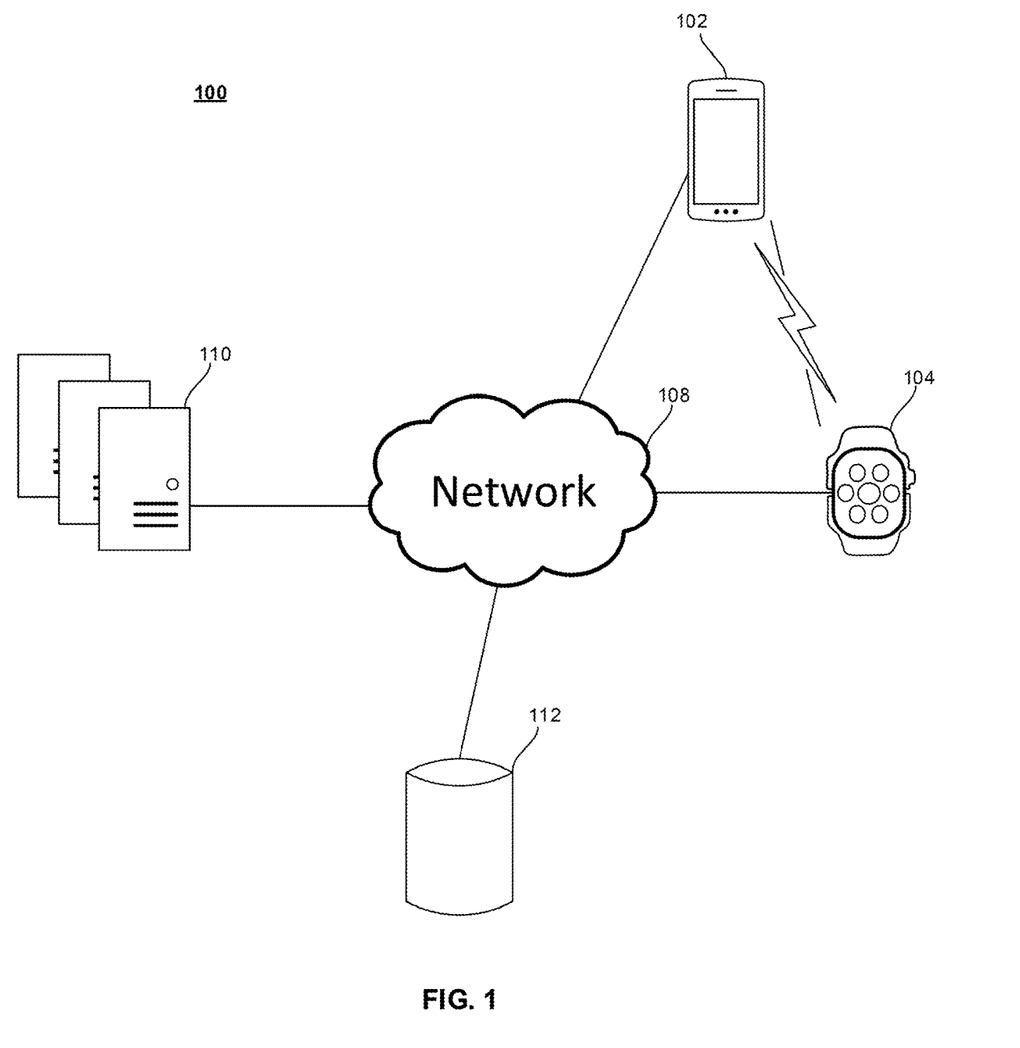
FIG. 1 is a diagram illustrating a network environment with interconnections between devices in accordance with aspects of the disclosure.

FIG. 1 is a diagram illustrating a network environment 100 with interconnections between devices. The network environment 100 may include electronic devices 102 and 104 that may be directly or indirectly connected to the network 108, as well as a remote server system 110 and/or database(s) 112. Remote server system 110 and database(s) 112 may each be connected to the network 108. The electronic devices 102 and 104 may be collocated and proximal to each other, and may be able to communicate to each other using a local communications connection. The electronic devices 102 and 104 may communicate with the remote server system 110 and/or database(s) 112 via the network 108. The network 108 may be a public communication network, such as the Internet, a cellular data network, or dial up modems over a telephone network, or a private communications network, such as private local area network (LAN), or leased lines.

In some examples, the remote server system 110 may be a single computing device, such as a computer server. In some examples, the remote server system 110 may represent one or more computing devices, such as a cloud of computers and/or a distributed system, that are communicatively coupled, for example, using the network 108. The cloud of computers and/or the distributed system may collectively, or individually, perform one or more functions that can be performed remotely. The remote server system 110 may be coupled with various databases, such as database(s) 112, storage services, or other computing devices. The remote server system 110, and the coupled databases, such as database(s) 112, storage services, or other computing devices may be geographically collocated, or may be disparately located. In some examples, the remote server system 110 may include components similar to all or a portion of the electronic system 500 described in connection with FIG. 5.

The electronic devices 102 and 104 may be computing devices such as laptop or desktop computers, smartphones, tablet computers. The electronic devices 102 and 104 may be wearable devices, such as eyeglasses or smart watches. The electronic devices 102 and 104 may have one or more processors coupled thereto and/or embedded therein, one or more televisions or other displays with one or more processors coupled thereto and/or embedded therein, or other appropriate computing devices that can be used to directly or indirectly connect to the network 108. In the example of FIG. 1, the electronic device 102 is depicted as a user equipment (UE), such as a smart phone, and the electronic device 104 is depicted as a proximal device, such as a smart watch. In the example of FIG. 1, electronic device 104 may be proximal/collocated with electronic device 102. In some examples, either of the electronic devices 102 and 104 may include components similar to all or a portion of the electronic system 500 described in connection with FIG. 5.

The electronic devices 102 and 104 may each include a wired and/or wireless network interface, such as a cellular network interface, for establishing a network connection to the network 108. The electronic devices 102 and 104 may each also include one or more local communications connection interface, such as a Bluetooth (BT) interface, a Bluetooth Low Energy (BLE) interface, a Wi-Fi interface, a Zigbee interface, an infra-red interface, or any other local wireless device interface, for establishing one or more local wireless device connection with the other of electronic devices 102 and 104. The local communications connection may be a peer-to-peer network connection or an infrastructure network connection. In the example of FIG. 1, the local communications connection may allow for communications between a UE, such as electronic device 102, and a proximal device, such as electronic device 104.

In some examples, one of the electronic devices 102 and 104 may utilize a local communications connection, such as a local wireless communications connection, as a tethering connection, e.g. to tether to the network connection of the other of the electronic devices 102 and 104. A tethering connection may allow one of the electronic devices 102 and 104 to connect to the network 108 through a network connection of the other of the electronic devices 102 and 104, such as the electronic device 104 connecting to network 108 via the electronic device 102. Thus, network traffic associated with the electronic device 104 may be routed to/from the electronic device 102 via the tethering connection, and then routed to the network 108 via the network connection of the electronic device 102. During initiation of a tethering connection, one of electronic devices 102 and 104 may negotiate roles of the electronic devices 102 and 104 for the tethering connection, e.g. a host/server role and a client role.

In some examples, one of the electronic devices 102 and 104 may monitor one or more attributes of its local communications connection, such as a tethering connection. For example, the one or more attributes may include a data rate associated with the local communications connection, a signal strength associated with the local communications connection, e.g., a received signal strength indicator (RSSI), a bit error rate associated with the communications connection, and/or any other attribute that may be indicative of the quality of the communications connection. A device performing such monitoring may have its network connection to network 108 turned on, while the other proximal electronic device may have its network connection to network 108 turned off. In some examples, the electronic device 102 or 104 performing the monitoring, may communicate, via the local communications connection, the monitored attributes and/or information regarding the monitored attributes to the other one of the electronic devices. In some examples, the electronic device 102 or 104 performing the monitoring of the local communications connection may compare a value of the monitored attribute(s) to one or more respective pre-determined threshold value(s) to determine the quality of the communications connection.

For example, if the monitored attribute(s) is above a respective pre-determined threshold, it may be determined that the quality of the communications connection is high, and the associated signal strength of the communications connection is strong. As another example, if the monitored attribute(s) is below a respective pre-determined threshold, it may be determined that the quality of the communications connection is low, and the associated signal strength of the communications connection is weak.

In a scenario in which a determination is made that the quality of the communications connection is low, in some examples, the device performing the monitoring may automatically send its network configuration information, via the local communications connection, to the other proximal electronic device and may request this device to turn on its network connection to network 108. In this scenario, in some examples, the device performing the monitoring may alternatively or additionally automatically enable a separate local communications connection, such as a Wi-Fi connection, and connect to the other proximal electronic device using the separate local communications connection. In this case, the device performing the monitoring may automatically send mobile hotspot configuration information to the other proximal electronic device before connecting to it via the separate communications connection. The other proximal device may then automatically configure itself based on the received configuration information. Such automatic configuration may be more efficient, less tedious, and less time-consuming, and more energy efficient than having the proximal device configure itself unassisted by the UE or having a user configure the proximal device manually.

In other examples, one of the electronic devices 102 and 104 may be connected to the network 108 and it may monitor attribute(s) of its network connection. The device performing the monitoring may have its network connection to network 108 turned on, while the other proximal electronic device may have its network connection to network 108 turned off. However, based on a comparison of the attribute(s) with a respective pre-determined threshold(s), the device performing the monitoring may notify the other proximal device, via the local communications connection, to turn on its own network connection to network 108. This may occur when the comparison indicates that the quality of the monitoring device's network connection is low, such as when the signal strength of the network connection is weak.

As an illustrative example, the electronic device 102 may be a user equipment (UE) and the electronic device 104 may be a proximal device. In particular, in this example, the UE may be a smart phone and the proximal device may be a smart watch. The UE may be connected to the network 108 directly via a network connection, such as through a cellular network interface. The proximal device may be able to connect to the network 108 via a network connection, such as through its own cellular network interface, but may initially have this connection turned off. Simultaneously, the UE and proximal device may also establish a local communications connection, such as a tethering connection, with each other. The local communications connection/tethering connection may be a wireless connection, such as a BT connection. Using the local communications connection, the proximal device may connect to the network 108 through the UE's network connection. The UE may monitor attribute(s) of its local communications connection, such as the attribute(s) described above.

For example, if the local communications connection is a BT connection, the UE may monitor an attribute that may be indicative of the quality of a BT connection with the proximal device. While performing the monitoring, the UE may measure and/or determine one or more of a RSSI, a bit error rate, and/or another attribute indicative of the quality of the BT connection. One or more of these attribute values may be compared to one or more predetermined threshold values to determine the quality of the BT connection. For example, a measured RSSI value for the BT connection may be compared to a pre-determined threshold value of 80 dBm. The BT connection may be determined to be an acceptable quality/strong BT connection if the RSSI value is above the 80 dBm threshold. The BT connection may be determined to be a low quality/weak BT connection if the RSSI value is below the 80 dBm threshold. Although 80 dBm is used as an example threshold value, the RSSI value may be compared to any pre-determined threshold value to determine the quality of the BT connection.

While performing the monitoring, the UE may determine that there is a low quality/weak BT connection based on the comparison of BT connection attribute(s) with respective thresholds, as described above. In this scenario, the UE may automatically perform one or more actions. In some examples, the UE may automatically send its cellular network configuration information to the proximal device and may request the proximal device to turn on its network connection to network 108. The cellular network configuration information may include particular cellular network attributes used by the UE's network connection. These cellular network attributes may be used by the proximal device to automatically configure its own network connection and to connect itself to the cellular network without having to search for the network attributes on its own and without a user manually entering these attributes.

The cellular network attributes may include, for example, one or more of a Radio Access Technology (RAT) type, such as Long Term Evolution (LTE) or New Radio (NR), a RAT frequency division duplex (FDD) configuration, a RAT time division duplex (TDD) configuration, an uplink/downlink (UL/DL) slot configuration for time division duplex (TDD), a RAT frequency, such as E-UTRA Absolute Radio Frequency Channel Number (EARFCN) or Absolute Radio Frequency Channel Number (ARFCN), and bandwidth, a RAT synchronization signal configuration, a RAT synchronization signal frequency/timing offset, relative to a Global Navigation Satellite System for example, a RAT cell-ID, such as a Physical Cell ID (PCI), RAT System Information Block (SIB) information, such as for a random access channel (RACH) configuration, a Global Navigation Satellite System (GNSS) assistant information, such as time/frequency, location, satellite configuration, etc., an ultra-wideband (UWB) configuration information, and the like. The UE may send the cellular network configuration information to the proximal device via the local communications connection, such as the BT connection.

In some examples, in addition or as an alternative to sending the cellular network information, the UE may automatically turn on a separate local communications connection, such as a Wi-Fi connection, e.g., via a Wi-Fi station (Wi-Fi STA) mode, and connect to the proximal device using the Wi-Fi connection. This connection may be used as a tethering connection by the proximal device to access network 108 via the UE. In this case, the UE may automatically send, via the original local communications connection, mobile hotspot configuration information to the proximal device before connecting to it via the Wi-Fi connection. For example, the mobile hotspot configuration information may include particular Wi-Fi network attributes, such as the Wi-Fi channel/service set identifier (SSID) and authentication information, which in some examples may be generated randomly by the UE. The UE may send the mobile hotspot configuration information to the proximal device via the local communications connection, such as the BT connection, or the activated Wi-Fi connection. These Wi-Fi network attributes may be used by the proximal device to automatically configure its Wi-Fi network connection without having to search for the network attributes on its own and without a user manually entering these attributes.

Such automatic configuration of the proximal device using information from the UE may be more efficient, less tedious, and less time-consuming, and more energy efficient than having the proximal device configure itself unassisted by the UE or having a user configure the proximal device manually.

Figure 2:
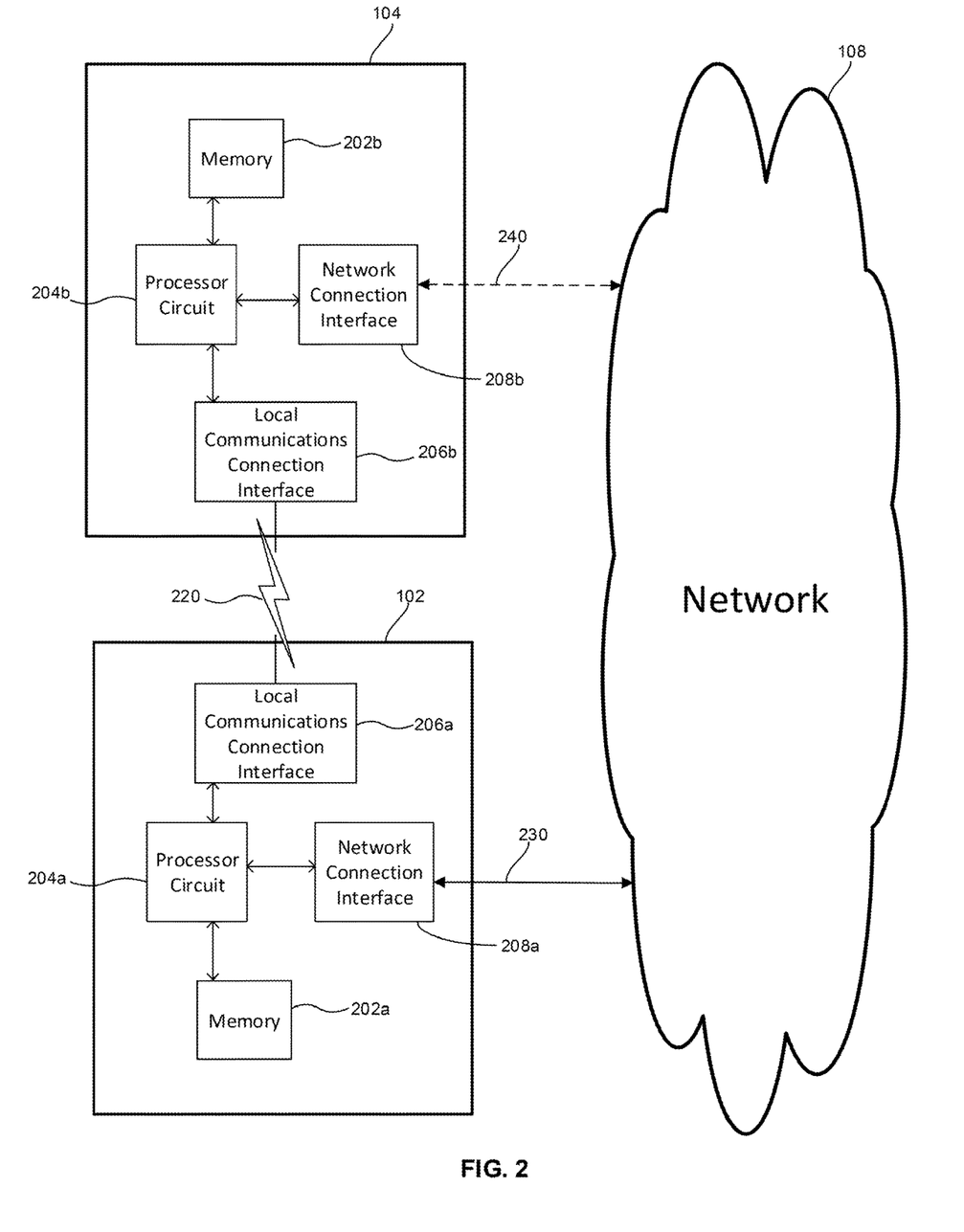
FIG. 2 is a block diagram illustrating communications between electronic devices and between each electronic device and a network in accordance with aspects of the disclosure.

FIG. 2 is a block diagram 200 illustrating communications between electronic devices and between each electronic device and a network. In some examples, the block diagram 200 includes the electronic devices 102 and 104 and the network 108. However, although not depicted, block diagram 200 may include one or more additional and/or alternative devices. Each of the depicted electronic devices 102 and 104 may include several components. Not all of the depicted components may be required, however, and one or more implementations may include additional components not shown in FIG. 2. Variations in the arrangement and type of the components may be made without departing from the spirit or scope of the claims as set forth herein. Additionally, different or fewer components may be included.

The electronic device 102 may include a memory 202a, a processor circuit 204a, a local communications connection interface, such as a wireless device interface 206a, and a network interface 208a. The electronic device 104 may include a memory 202b, a processor circuit 204b, a local communications connection interface, such as a wireless device interface 206b, and a network interface 208b.

The electronic devices 102 and 104 may be proximal to each other and collocated. The electronic devices 102 and 104 may establish a communications connection, such as wireless communications connection 220, between the devices using the wireless device interfaces 206a and 206b. The electronic device 102 may have a direct network connection 230, such as a cellular network connection, with the network 108, via the network interface 208a. The electronic device 104 may have a direct network connection 240, such as a cellular network connection, with network 108 via the network interface 208b.

The network interfaces 208a and 208b may be any network interface capable of establishing a network connection with the network 108, such as a cellular network interface or the like. The wireless device interfaces 206a and 206b may be any interfaces capable of broadcasting messages, communicating messages, and/or establishing a local communications connection, such as a tethering connection between the electronic devices 102 and 104. Examples of interfaces that may be used by wireless device interfaces 206a and 206b include a Bluetooth (BT) interface, a BLE interface, a Wi-Fi interface, a Zigbee interface, an infra-red interface, and the like. In some examples, the network interfaces 208a and 208b and/or the wireless device interfaces 206a and 206b may include one or more radios for wireless transmissions. The electronic devices 102 and 104 may communicate information and/or receive communicated information via the wireless device interfaces 206a and 206b.

In one or more implementations, one or more of the memories 202a and 202b, the processor circuits 204a and 204b, the wireless device interfaces 206a and 206b, and/or the network interfaces 208a and 208b may be implemented in software, such as in subroutines and code. In one or more implementations, these components/modules may be implemented in hardware, such as in an Application Specific Integrated Circuit (ASIC), a Field Programmable Gate Array (FPGA), a Programmable Logic Device (PLD), a controller, a state machine, gated logic, discrete hardware components, or any other suitable devices. In one or more implementations, these components/modules may be implemented using a combination of both software and hardware. Additional features and functions of these modules according to various aspects of the subject technology are further described in the present disclosure.

In the example of FIG. 2, the electronic device 102 may be connected to the network 108 via the network connection 230, such as a cellular network connection, established using the network interface 208a. In this example, this network connection, such as a cellular network connection, may be initially turned on. In addition, in the example of FIG. 2, the electronic device 104 may be connected to the network 108 via the network connection 240, such as a cellular network connection, established using the network interface 208b. In this example, this network connection, such as a cellular network connection, may be initially turned off.

The electronic devices 102 and 104 may have established a local communications connection, such as a tethering connection, via the wireless device interfaces 206a and 206b. In particular, the electronic device 104 may be connected to the network 108 through the network interface 208b of the electronic device 102 via the tethering connection. In some examples, the network connection of the electronic device 102 may utilize a first communication protocol, such as a cellular communications protocol. In such examples, the tethering connection may utilize a second communications protocol, such as a BT, BLE, Wi-Fi, or Zigbee communications protocol. In this scenario, the electronic device 102 may convert communications received using the first communications protocol to the second communications protocol, and vice-versa.

As an illustrative example, electronic device 102 may be a user equipment (UE), such as a smart phone, and the electronic device 104 may be a proximal device, such as a smart watch. There may be a local communications connection 220, such as a Bluetooth (BT) connection, between the UE and the proximal device. This local communications connection may be facilitated by the wireless device interfaces 206a and 206b. The UE may monitor attribute(s), such as those described above, of the wireless BT connection with the proximal device. For example, the UE may use the processor circuit 204a to perform such monitoring. In particular, the UE may monitor an attribute that may be indicative of the quality of the BT connection with the proximal device. The UE may initially have its network connection 230 via network interface 208a to network 108 turned on, while the proximal device may have its network connection 240 via network interface 208b to network 108 turned off.

While performing the monitoring, the UE may measure and/or determine one or more of a RSSI, a bit error rate, and/or another attribute indicative of the quality of the BT connection. One or more of these attribute values may be compared, for example, using the processor circuit 204a, to one or more pre-determined threshold values to determine the quality of the BT connection. The one or more pre-determined threshold values may be predetermined and stored, for example, in the memory 202a of the UE. For example, a measured RSSI value for the BT connection may be compared to a pre-determined threshold value of 80 dBm. The BT connection may be determined to be an acceptable quality/strong BT connection if the RSSI value is above the 80 dBm threshold. The BT connection may be determined to be a low quality/weak BT connection if the RSSI value is below the 80 dBm threshold. Although 80 dBm is used as an example threshold value, the RSSI value may be compared to any pre-determined threshold value to determine the quality of the BT connection.

While performing the monitoring, the UE may determine that there is a low quality/weak BT connection based on the comparison of BT connection attribute(s) with respective thresholds, as described above. In this scenario the UE may automatically perform one or more actions.

In some examples, the UE may automatically send its cellular network configuration information to the proximal device and may request the proximal device to turn on its network connection 240 to network 108. The cellular network configuration information may include particular cellular network attributes used by the UE's network connection. These cellular network attributes may be used by the proximal device to automatically configure its own network connection and to connect itself to the cellular network without having to search for the network attributes on its own and without a user manually entering these attributes.

The cellular network attributes may include, for example, one or more of a Radio Access Technology (RAT) type, such as Long Term Evolution (LTE) or New Radio (NR), a RAT frequency division duplex (FDD) configuration, a RAT time division duplex (TDD) configuration, an uplink/downlink (UL/DL) slot configuration for time division duplex (TDD), a RAT frequency, such as E-UTRA Absolute Radio Frequency Channel Number (EARFCN) or Absolute Radio Frequency Channel Number (ARFCN), and bandwidth, a RAT synchronization signal configuration, a RAT synchronization signal frequency/timing offset, relative to a Global Navigation Satellite System for example, a RAT cell-ID, such as a Physical Cell ID (PCI), RAT System Information Block (SIB) information, such as for a random access channel (RACH) configuration, a Global Navigation Satellite System (GNSS) assistant information, such as time/frequency, location, satellite configuration, etc., an ultra-wideband (UWB) configuration information, and the like. The UE may send the cellular network configuration information to the proximal device via the local communications connection 220, such as the BT connection. In some examples, the UE cellular network configuration information may have been previously stored in memory 202a of the UE, and may have been retrieved by the UE from the memory 202a. Once it is sent from the UE, this information may be stored in memory 202b of the proximal device. In some examples, the proximal device may automatically configure its settings based on the configuration information that it received and/or stored from the UE so that it may rapidly establish/turn on the network connection 240 to network 108. In some examples, the UE may turn off its network connection 230 to network 108 after the proximal device establishes and turns on the network connection 240.

In some examples, in addition or as an alternative to sending the cellular network information, the UE may automatically turn on a separate local communications connection 220, such as a Wi-Fi connection, e.g., via a Wi-Fi station (Wi-Fi STA) mode, and may connect to the proximal device using the Wi-Fi connection. This connection may be used as a tethering connection by the proximal device to access network 108 via the UE. In this case, the UE may automatically send, via the original local communications connection, mobile hotspot configuration information to the proximal device before connecting to it via the Wi-Fi connection. For example, the mobile hotspot configuration information may include particular Wi-Fi network attributes, such as the Wi-Fi channel/service set identifier (SSID) and authentication information, which in some examples may be generated randomly by the UE. The UE may send the mobile hotspot configuration information to the proximal device via the local communications connection 220, such as the BT connection, or the activated Wi-Fi connection. These Wi-Fi network attributes may be used by the proximal device to automatically configure its Wi-Fi network connection without having to search for the network attributes on its own and without a user manually entering these attributes.

In some examples, the mobile hotspot configuration information may have been previously stored in memory 202a of the UE, and may have been retrieved by the UE from the memory 202a. Once it is sent from the UE, this information may be stored in memory 202b of the proximal device. In some examples, the proximal device may automatically configure its settings based on the configuration information that it received and/or stored from the UE so that it may rapidly establish the separate local communications connection 220, which may be a Wi-Fi tethering connection, which allows the proximal device to access network 108 via the UE. In some examples, the UE or proximal device may disable its BT connection after the Wi-Fi tethering connection has been established.

Figure 3:
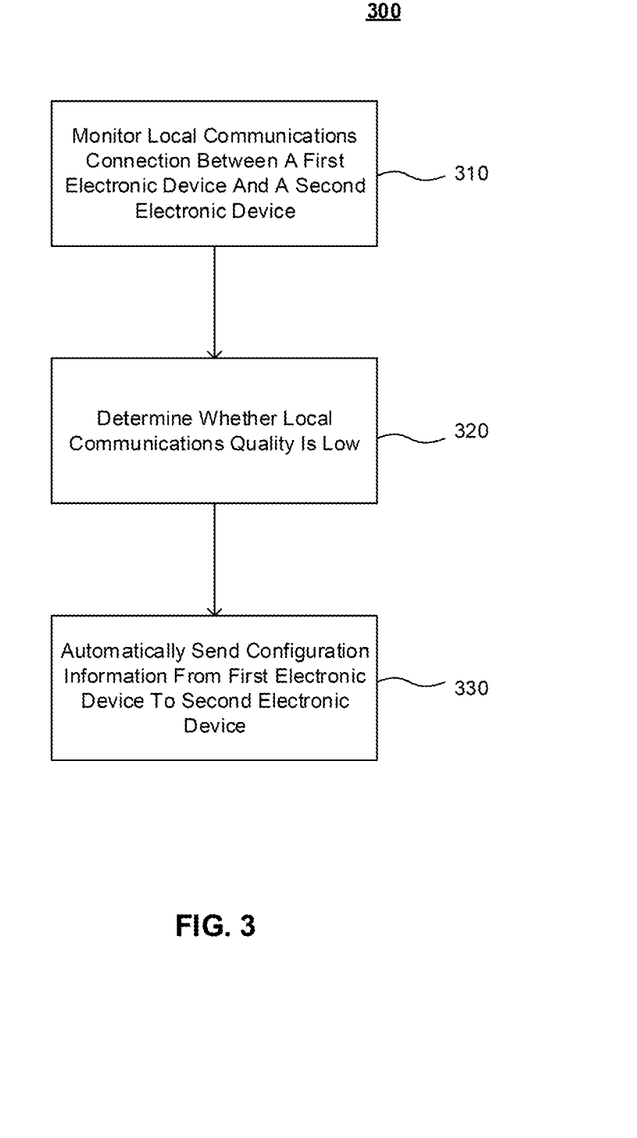
FIG. 3 is a flow diagram of example process for configuring network connection settings of a device in accordance with aspects of the disclosure.

FIG. 3 is a flow diagram of example process 300 for configuring network connection settings of a device. The process 300 may be performed, by way of example, by a first electronic device, which may be a user equipment (UE) and may use other resources of one or more other electronic devices, such as what is described in connection with FIGS. 1, 2 and 5. Although the blocks of process 300 include examples with respect to components shown in FIG. 2, components shown in FIGS. 1 and 5 may additionally or alternatively be used as examples without departing from the scope or spirit of what is disclosed herein.

In block 310, a connection quality value for a local communications connection between a first electronic device and a second electronic device may be monitored at a first electronic device. The first device may be proximal to the second device. For example, as described in connection with FIGS. 1 and 2, if the first electronic device 102, is a user equipment (UE), and the second electronic device 104 is a proximal device, there may be a local communications connection 220 between the UE and the proximal device. In this example, the UE may be a smart phone, the proximal device may be a smart watch, and the local communications connection 220 may be a Bluetooth (BT) connection. This local communications connection may be facilitated by the wireless device interfaces 206a and 206b described in connection with FIG. 2.

The UE may monitor attribute(s) indicative of the quality of the local communications connection 220, such as a wireless BT connection, between the UE and the proximal device. For example, the UE may use the processor circuit 204a described in connection with FIG. 2 to perform such monitoring. In some examples, while performing the monitoring, the UE may measure and/or determine one or more of a RSSI, a bit error rate, and/or another attribute value indicative of the quality of the local communications connection.

In block 320, a determination may be made that the local communications connection quality value is low, such as by determining if it is below a pre-determined threshold value. For example, the UE, described in connection with block 310 and FIG. 2, may use the attribute value(s) that it measured/determined during the monitoring and compare these value(s) to one or more pre-determined threshold values to determine the quality of the local communications connection 220, such as a BT connection. Such a comparison may be made using the processor circuit 204a described in connection with FIG. 2. The one or more threshold values may have been previously predetermined and stored, for example, in the memory 202a of the UE described in connection with FIG. 2. In some examples, the quality of the local communications connection 220 may be determined to be strong or weak based on the comparison. For example if the attribute value indicative of the quality of the local communications connection is above a pre-determined threshold value, it may be determined that the local communications connection is strong. For example if the attribute value indicative of the quality of the local communications connection is below or at the same value as a pre-determined threshold value, it may be determined that the local communications connection is weak. As a specific example, a measured RSSI value for a local BT connection may be compared to a pre-determined threshold value of 80 dBm. The BT connection may be determined to be an acceptable quality/strong BT connection if the RSSI value is above the 80 dBm threshold. The BT connection may be determined to be a low quality/weak BT connection if the RSSI value is below the 80 dBm threshold. Although 80 dBm is used as an example threshold value, the RSSI value may be compared to any pre-determined threshold value to determine the quality of the BT connection.

In block 330, configuration information may automatically be sent from the first electronic device to the second electronic device, and the settings of the second electronic device may automatically be configured based on the configuration information to allow the second electronic device to connect to a network, such as a cellular network. This may occur in response to a determination, in block 320, that the local communications connection quality value is below a threshold value, such as when the local communications connection quality is weak.

For example, the UE described in connection with blocks 310, 320, and FIG. 2, may have a network connection 230, such as a cellular network connection, via network interface 208a to the network 108. The proximal device may have network connection 240, such as a cellular network connection, via network interface 208b to the network 108. The UE may initially have its network connection 230 turned on, while the proximal device may have its network connection 240 turned off. If, for example, the UE determines at block 310 that there is a low quality/weak BT connection, the UE may automatically send its cellular network configuration information to the proximal device. The UE may request the proximal device to turn on its network connection 240, such as a cellular network connection, to network 108.

The cellular network configuration information may include particular cellular network attributes used by the UE's network connection. These cellular network attributes may be used by the proximal device to automatically configure its own network connection and to connect itself to the cellular network without having to search for the network attributes on its own and without a user manually entering these attributes. The cellular network attributes may include, for example, one or more of a Radio Access Technology (RAT) type, such as Long Term Evolution (LTE) or New Radio (NR), a RAT frequency division duplex (FDD) configuration, a RAT time division duplex (TDD) configuration, an uplink/downlink (UL/DL) slot configuration for time division duplex (TDD), a RAT frequency, such as E-UTRA Absolute Radio Frequency Channel Number (EARFCN) or Absolute Radio Frequency Channel Number (ARFCN), and bandwidth, a RAT synchronization signal configuration, a RAT synchronization signal frequency/timing offset, relative to a Global Navigation Satellite System for example, a RAT cell-ID, such as a Physical Cell ID (PCI), RAT System Information Block (SIB) information, such as for a random access channel (RACH) configuration, a Global Navigation Satellite System (GNSS) assistant information, such as time/frequency, location, satellite configuration, etc., an ultra-wideband (UWB) configuration information, and the like.

The UE may send the cellular network configuration information to the proximal device via the local communications connection 220, such as the BT connection. In some examples, the UE cellular network configuration information may have been previously stored in memory 202a of the UE, and may have been retrieved by the UE from the memory 202a. Once it is sent from the UE, this information may be stored in memory 202b of the proximal device. In some examples, the proximal device may automatically configure its settings based on the configuration information that it received and/or stored from the UE so that it may rapidly establish/turn on the network connection 240 to network 108. In some examples, the UE may turn off its network connection 230 to network 108 after the proximal device establishes and turns on the network connection 240.

In some examples, in block 330, the first electronic device may, in addition or as an alternative to sending the cellular network information, send information regarding its connection with a Wi-Fi network to the second electronic device. In particular, the first electronic device may automatically send Wi-Fi network configuration information, such as its Wi-Fi Access Point information, to the second electronic device. For example, the UE may automatically send to the proximal device Wi-Fi Access Point information, including channel/service set identifier (SSID) and authentication information, which it uses for network connection 230. This information may allow the proximal device to connect to the Wi-Fi Access Point via network connection 240.

In some examples, in block 330, if the configuration information of the first electronic device was previously transmitted to the second electronic device, and the configuration information has not changed, the first electronic device may not send the configuration information to the second electronic device. For example, if the UE determines that configuration information that it previously sent to the proximal device has not changed, the UE may not send configuration information to the proximal device, and may direct the proximal device to turn on the network connection 240.

Figure 4:
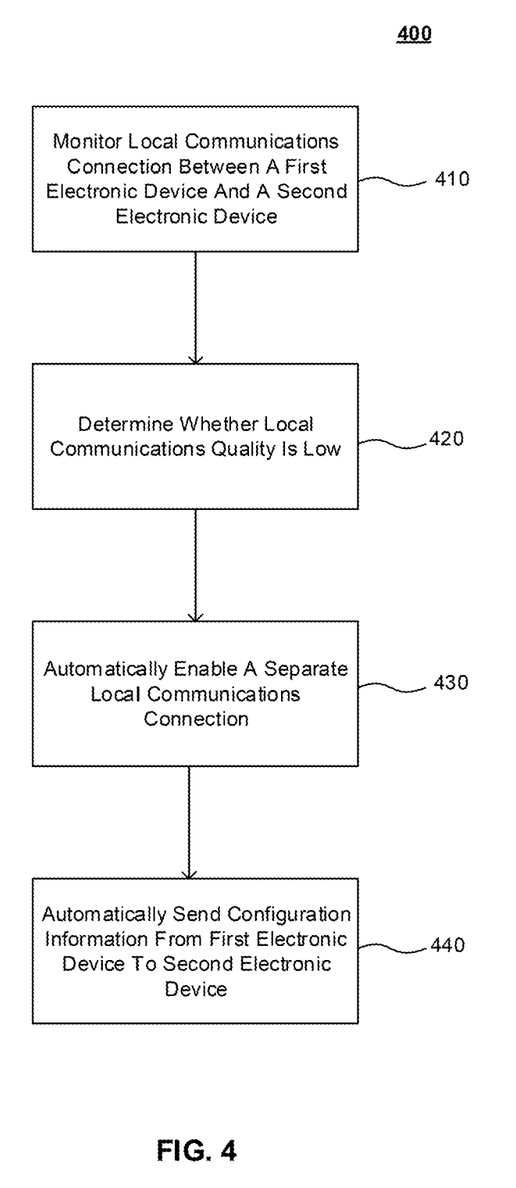
FIG. 4 is a flow diagram of example process for configuring local connection settings of a device in accordance with aspects of the disclosure.

FIG. 4 is a flow diagram of example process 400 for configuring local connection settings of a device. The process 400 may be performed, by way of example, by a first electronic device, which may be a user equipment (UE) and may use other resources of one or more other electronic devices, such as what is described in connection with FIGS. 1, 2 and 5. Although the blocks of process 400 include examples with respect to components shown in FIG. 2, components shown in FIGS. 1 and 5 may additionally or alternatively be used as examples without departing from the scope or spirit of what is disclosed herein.

In block 410, a connection quality value for a local communications connection between a first electronic device and a second electronic device may be monitored at a first electronic device. The first device may be proximal to the second device. For example, as described in connection with FIGS. 1 and 2, if the first electronic device 102, is a user equipment (UE), and the second electronic device 104 is a proximal device, there may be a local communications connection 220 between the UE and the proximal device. In this example, the UE may be a smart phone, the proximal device may be a smart watch, and the local communications connection 220 may be a Bluetooth (BT) connection. This local communications connection may be facilitated by the wireless device interfaces 206a and 206b described in connection with FIG. 2.

The UE may monitor attribute(s) indicative of the quality of the local communications connection 220, such as a wireless BT connection, between the UE and the proximal device. For example, the UE may use the processor circuit 204a described in connection with FIG. 2 to perform such monitoring. In some examples, while performing the monitoring, the UE may measure and/or determine one or more of a RSSI, a bit error rate, and/or another attribute value indicative of the quality of the local communications connection.

In block 420, a determination may be made that the local communications connection quality value is low, such as by determining if it is below a pre-determined threshold value. For example, the UE, described in connection with block 410 and FIG. 2, may use the attribute value(s) that it measured/determined during the monitoring and compare these value(s) to one or more pre-determined threshold values to determine the quality of the local communications connection 220, such as a BT connection. Such a comparison may be made using the processor circuit 204a described in connection with FIG. 2. The one or more threshold values may have been previously predetermined and stored, for example, in the memory 202a of the UE described in connection with FIG. 2. In some examples, the quality of the local communications connection 220 may be determined to be strong or weak based on the comparison. For example if the attribute value indicative of the quality of the local communications connection is above a pre-determined threshold value, it may be determined that the local communications connection is strong. For example if the attribute value indicative of the quality of the local communications connection is below or at the same value as a predetermined threshold value, it may be determined that the local communications connection is weak. As a specific example, a measured RSSI value for a local BT connection may be compared to a pre-determined threshold value of 80 dBm. The BT connection may be determined to be an acceptable quality/strong BT connection if the RSSI value is above the 80 dBm threshold. The BT connection may be determined to be a low quality/weak BT connection if the RSSI value is below the 80 dBm threshold. Although 80 dBm is used as an example threshold value, the RSSI value may be compared to any pre-determined threshold value to determine the quality of the BT connection.

In block 430, the first electronic device may automatically enable a separate local communications connection to communicate with the second electronic device. This may occur in response to a determination, in block 420, that the local communications connection quality value is below a threshold value, such as when the local communications connection quality is weak. For example, the UE described in connection with block 410, 420, and FIG. 2, may automatically turn on a separate local communications connection 220, such as a Wi-Fi connection, e.g., via a Wi-Fi station (Wi-Fi STA) mode.

In block 440 configuration information may be automatically sent from the first electronic device to the second electronic device, and the settings of the second electronic device may automatically be configured based on the configuration information to allow the second electronic device to connect to a network, such as by tethering. The configuration information may be sent via the original local communications connection 220, such as the BT connection. In particular, the local communications connection, which may be configured based on the configuration information, may be used as a tethering connection by the second electronic device to access network 108 via the first electronic device.

For example, the UE, described in connection with blocks 410, 420, 430, and FIG. 2, may automatically send mobile hotspot configuration information to the proximal device before connecting to it via the Wi-Fi connection. For example, the mobile hotspot configuration information may include particular Wi-Fi network attributes, such as the Wi-Fi channel/service set identifier (SSID) and authentication information, which in some examples may be generated randomly by the UE. The UE may send the mobile hotspot configuration information to the proximal device via the local communications connection 220, such as the BT connection, or the activated Wi-Fi connection. These Wi-Fi network attributes may be used by the proximal device to automatically configure its Wi-Fi network connection without having to search for the network attributes on its own and without a user manually entering these attributes.

In some examples, the mobile hotspot configuration information may have been previously stored in memory 202a of the UE, and may have been retrieved by the UE from the memory 202a. Once it is sent from the UE, this information may be stored in memory 202b of the proximal device. In some examples, the proximal device may automatically configure its settings based on the configuration information that it received and/or stored from the UE so that it may rapidly establish the separate local communications connection 220, which may be a Wi-Fi tethering connection, which allows the proximal device to access network 108 via the UE. In some examples, the UE or proximal device may disable the BT connection after the Wi-Fi tethering connection has been established.

In some examples, in block 440, if the configuration information of the first electronic device was previously transmitted to the second electronic device, and the configuration information has not changed, the first electronic device may not send the configuration information to the second electronic device. For example, if the UE determines that configuration information that it previously sent to the proximal device has not changed, the UE may not send configuration information to the proximal device, and may direct the proximal device to establish the separate local communications connection 220 based on the previously sent configuration information.

Figure 5:
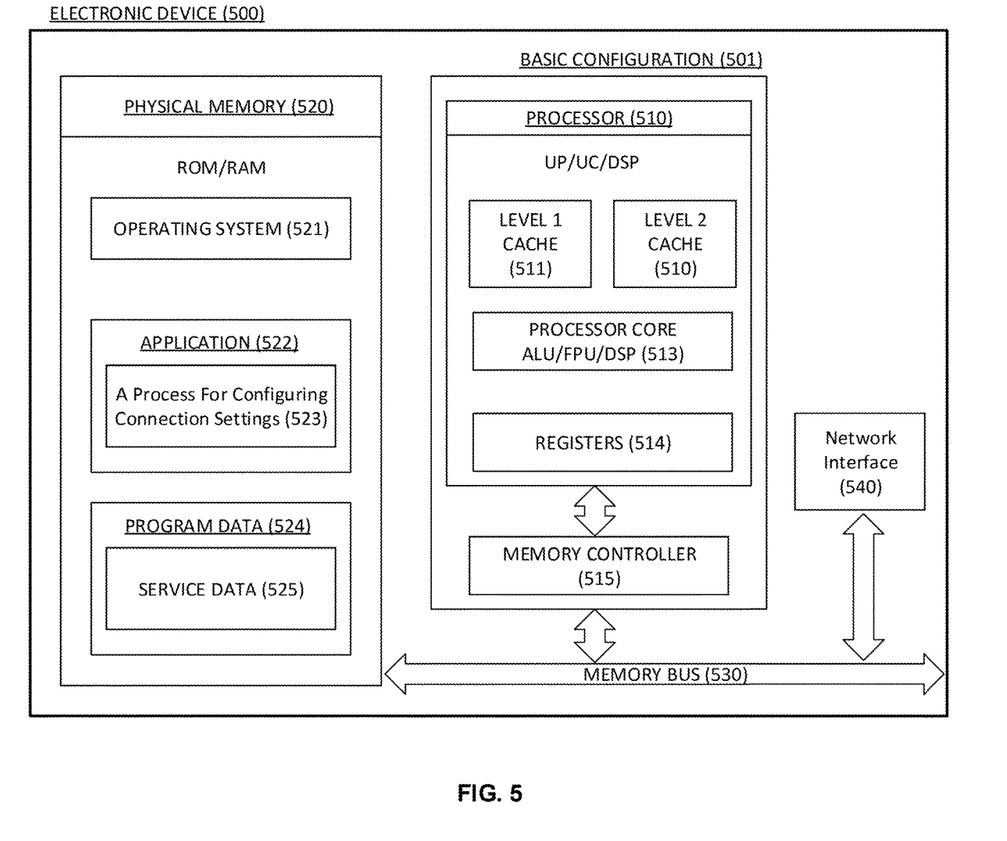
FIG. 5 is a block diagram of an example electronic device in accordance with aspects of the disclosure.

FIG. 5 is a block diagram of an example electronic device 500. The electronic device 500 may include one or more processors 510, system memory 520, a bus 530, the networking interface(s) 540, and other components (not shown), such as storage(s), output device interface(s), input device interface(s). A bus 530 may be used for communicating between the processor 510, the system memory 520, the networking interface(s) 540, and other components.

Depending on the desired configuration, the processor 510 may be of any type including but not limited to a microprocessor (uP), a microcontroller (uC), a digital signal processor DSP), or any combination thereof. The processor 510 may include one more level of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 may also be used with the processor 510, or in some implementations the memory controller 515 can be an internal part of the processor 510.

Depending on the desired configuration, the physical memory 520 may be of any type including but not limited to volatile memory, such as RAM, non-volatile memory, such as ROM, flash memory, etc., or any combination thereof. The physical memory 520 may include an operating system 521, one or more applications 522, and program data 524. The application 522 may include a process of writing data to physical memory. Non-transitory computer-readable medium program data 524 may include storing instructions that, when executed by one or more processing devices, implement a process for configuring the network and local connection settings of a device 523. In some examples, the application 522 may be arranged to operate with program data 524 on an operating system 521.

The electronic device 500 may have additional features or functionality, and additional interfaces to facilitate communications between the basic configuration 501 and any required devices and interfaces.

Physical memory 520 may be an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by electronic device 500. Any such computer storage media can be part of the device 500.

Network interface(s) 540 may couple the electronic device 500 to a network (not shown) and/or to another electronic device (not shown). In this manner, the electronic device 500 can be a part of a network of electronic devices, such as a local area network ("LAN"), a wide area network ("WAN"), an intranet, or a network of networks, such as the Internet. In some examples, the electronic device 500 may include a network connection interface for forming a network connection to a network and a local communications connection interface for forming a tethering connection with another device. The connections may be wired or wireless. The electronic device 500 may bridge the network connection and the tethering connection to connect the other device to the network via the network interface(s) 540. Any or all components of electronic device 500 may be used in conjunction with the subject of the present disclosure.

The electronic device 500 may be implemented as a portion of a small form factor portable (or mobile) electronic device such as a cell phone, a smartphone, a smartwatch, a personal data assistant (PDA), a personal media player device, a tablet computer (tablet), a wireless web-watch device, a personal headset device, a wearable device, an application-specific device, or a hybrid device that include any of the above functions. The electronic device 500 may also be implemented as a personal computer including both laptop computer and non-laptop computer configurations. The electronic device 500 may also be implemented as a server or a large-scale system.

Aspects of the present disclosure may be implemented as a computer implemented process, a system, or as an article of manufacture such as a memory device or non-transitory computer readable storage medium. The computer readable storage medium may be readable by an electronic device and may comprise instructions for causing an electronic device or other device to perform processes and techniques described in the present disclosure. The computer readable storage medium may be implemented by a volatile computer memory, non-volatile computer memory, hard drive, solid state memory, flash drive, removable disk, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

Although various blocks, algorithms, or the like, such as those described in connection with FIGS. 3 and 4, may be described or claimed in a particular sequential order, such processes may be configured to work in different orders. In other words, any sequence or order of operations that may be explicitly described or claimed does not necessarily indicate a requirement that the operations be performed in that order. The operations of processes described herein may be performed in any order possible, and operations may be added or omitted.

Although a process, such as the process described in connection with FIG. 3 or 4, may be described as including a plurality of operations, which does not imply that all or any of the operations are preferred, essential or required. Various other implementations may include other processes that omit some or all of the described operations. Although a process may be described singly or without reference to other products or processes, in some examples the process may interact with other products or processes. Such interaction may be provided to enhance the flexibility or desirability of the process.

The systems and techniques presented herein detail automatically configuring a proximal device, such as a smart watch, a tablet, or any other smart device, based on configuration information sent from the user equipment (UE) to the proximal device when the local communications connection, such as a wireless connection, between the devices is weak. In particular, the systems and techniques presented herein for such automatic configuration may be more efficient, more energy efficient, less tedious, and less time-consuming than configuring the proximal device manually.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for a long period of time (e.g. weeks at a time). In addition, devices that are in communication with each other may communicate directly or indirectly through one or more intermediaries.

The foregoing discussion is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The invention claimed is:

1. A method comprising:
monitoring, at a first device connected to a network, a connection quality for a local communications connection between the first device and a second device tethered to the network, wherein the first device is proximal to the second device;
determining that the connection quality is below a predetermined threshold value; and
in response to determining that the connection quality is below a threshold value, sending from the first device, configuration information to the second device to allow the second device to directly connect to the network.

2. The method of claim 1, wherein the first device is a user equipment device, and the second device is a proximal device.

3. The method of claim 1, wherein the connection quality includes an indication of signal strength of the local communications connection between the first device and the second device.

4. The method of claim 1, wherein the configuration information is associated with cellular network attributes used by the first device to connect to the network.

5. The method of claim 4, wherein the cellular network attributes include at least one of a Radio Access Technology (RAT) type, a RAT frequency division duplex configuration, a RAT time division duplex configuration, a uplink/downlink slot configuration for time division duplex, a RAT frequency and bandwidth, a RAT synchronization signal configuration, a RAT synchronization signal frequency/timing offset, a RAT cell-ID, a Global Navigation Satellite System assistant information, or an Ultra-wideband configuration information.

6. The method of claim 1, wherein the configuration information is associated with Wi-Fi network attributes.

7. The method of claim 6, wherein the Wi-Fi network attributes include at least one of mobile hotspot configuration information, a channel/service set identifier (SSID), and authentication information.

8. A system comprising one or more processors configured to:
monitor, at a first device connected to a network, a connection quality for a local communications connection between the first device and a second device tethered to the network, wherein the first device is proximal to the second device;
determine that the connection quality is below a predetermined threshold value; and
send, from the first device, configuration information to the second device to allow the second device to directly connect to the network.

9. The system of claim 8, wherein the first device is a user equipment device, and the second device is a proximal device.

10. The system of claim 8, wherein the connection quality includes an indication of signal strength of the local communications connection between the first device and the second device.

11. The system of claim 8, wherein the configuration information is associated with cellular network attributes used by the first device to connect to the network.

12. The system of claim 11, wherein the cellular network attributes include at least one of a Radio Access Technology (RAT) type, a RAT frequency division duplex configuration, a RAT time division duplex configuration, a uplink/downlink slot configuration for time division duplex, a RAT frequency and bandwidth, a RAT synchronization signal configuration, a RAT synchronization signal frequency/timing offset, a RAT cell-ID, a Global Navigation Satellite System assistant information, or an Ultra-wideband configuration information.

13. The system of claim 8, wherein the configuration information is associated with Wi-Fi network attributes.

14. The system of claim 13, wherein the Wi-Fi network attributes include at least one of mobile hotspot configuration information, a channel/service set identifier (SSID), and authentication information.

15. A non-transitory computer-readable medium storing instructions, that when executed by one or more processors, cause the one or more processors to:
monitor, at a first device connected to a network, a connection quality for a local communications connection between the first device and a second device tethered to the network, wherein the first device is proximal to the second device;
determine that the connection quality is below a predetermined threshold value; and
send, from the first device, configuration information to the second device to allow the second device to directly connect to the network.

16. The non-transitory computer-readable medium of claim 15, wherein the first device is a user equipment device, and the second device is a proximal device.

17. The non-transitory computer-readable medium of claim 15, wherein the connection quality includes an indication of signal strength of the local communications connection between the first device and the second device.

18. The non-transitory computer-readable medium of claim 15, wherein the configuration information is associated with cellular network attributes used by the first device to connect to the network.

19. The non-transitory computer-readable medium of claim 18, wherein the cellular network attributes include at least one of a Radio Access Technology (RAT) type, a RAT frequency division duplex configuration, a RAT time division duplex configuration, a uplink/downlink slot configuration for time division duplex, a RAT frequency and bandwidth, a RAT synchronization signal configuration, a RAT synchronization signal frequency/timing offset, a RAT cell-ID, a Global Navigation Satellite System assistant information, or an Ultra-wideband configuration information.

20. The non-transitory computer-readable medium of claim 15, wherein the configuration information is associated with Wi-Fi network attributes.

* * * * *